US008300507B2

(12) United States Patent
Lin

(10) Patent No.: US 8,300,507 B2
(45) Date of Patent: Oct. 30, 2012

(54) DISK POSITION SYSTEM AND METHOD

(75) Inventor: Jun-Jia Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/221,850

(22) Filed: Aug. 30, 2011

(65) Prior Publication Data

US 2012/0113785 A1 May 10, 2012

(30) Foreign Application Priority Data

Nov. 4, 2010 (CN) .......................... 2010 1 01053186

(51) Int. Cl.
*G11B 7/00* (2006.01)
(52) U.S. Cl. .................................... 369/53.1; 369/53.13
(58) Field of Classification Search ................. 369/53.1, 369/53.12, 53.13, 53.15, 53.17, 53.18; 711/114, 711/112, 111
See application file for complete search history.

(56) References Cited

U.S. PATENT DOCUMENTS

2003/0081378 A1* 5/2003 Debbins et al. ............... 361/685
2005/0114477 A1* 5/2005 Willging et al. .............. 709/220

* cited by examiner

*Primary Examiner* — Nabil Hindi

(74) *Attorney, Agent, or Firm* — Altis Law Group, Inc.

(57) ABSTRACT

A computing device and method determines a position of a disk when the disk works abnormally. The computer searches out problem disks by determining if each disk included in the just a bundle of disks (JBOD) works normally, and determining if the computer can obtain a serial number of each problem disk. The computer notifies a user of the order number of the problem disk and an order number of the JBOD, in response to a determination that the computer can obtain serial number of the problem disk. The computer obtains the order number of the problem disk by deleting the data of the disk that works normally from the disk table, and notifying the user of the order number of the disk and the order number of the JBOD, in response to a determination that the computer fails to obtain serial number of the problem disk.

12 Claims, 3 Drawing Sheets

DISK POSITION SYSTEM AND METHOD

BACKGROUND

1. Technical Field

Embodiments of the present disclosure relate to position processing technology, and particularly to a disk position system and method.

2. Description of Related Art

Just a bunch of disks (JBOD) is a storage structure that combines multiple physical disks into a single virtual disk. Each disk in the JBOD structure has a corresponding device node in an operating system. However, because the corresponding device node is a random number, a user may find it difficult to determine a position of the disk according to the corresponding device node. Many users determine the position of the disk with a serial number of the disk. For example, the operating system reads the serial number of the disk from the disk and searches out the disk by the serial number in the JBOD. However, if the disk works abnormally, the operating system fails to obtain the serial number of the disk. Hence, it is difficult for a user to determine the position of the disk especially when the disk works abnormally. More useful and convenient methods to determine the position of the disks included in the JBOD are desired by users.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
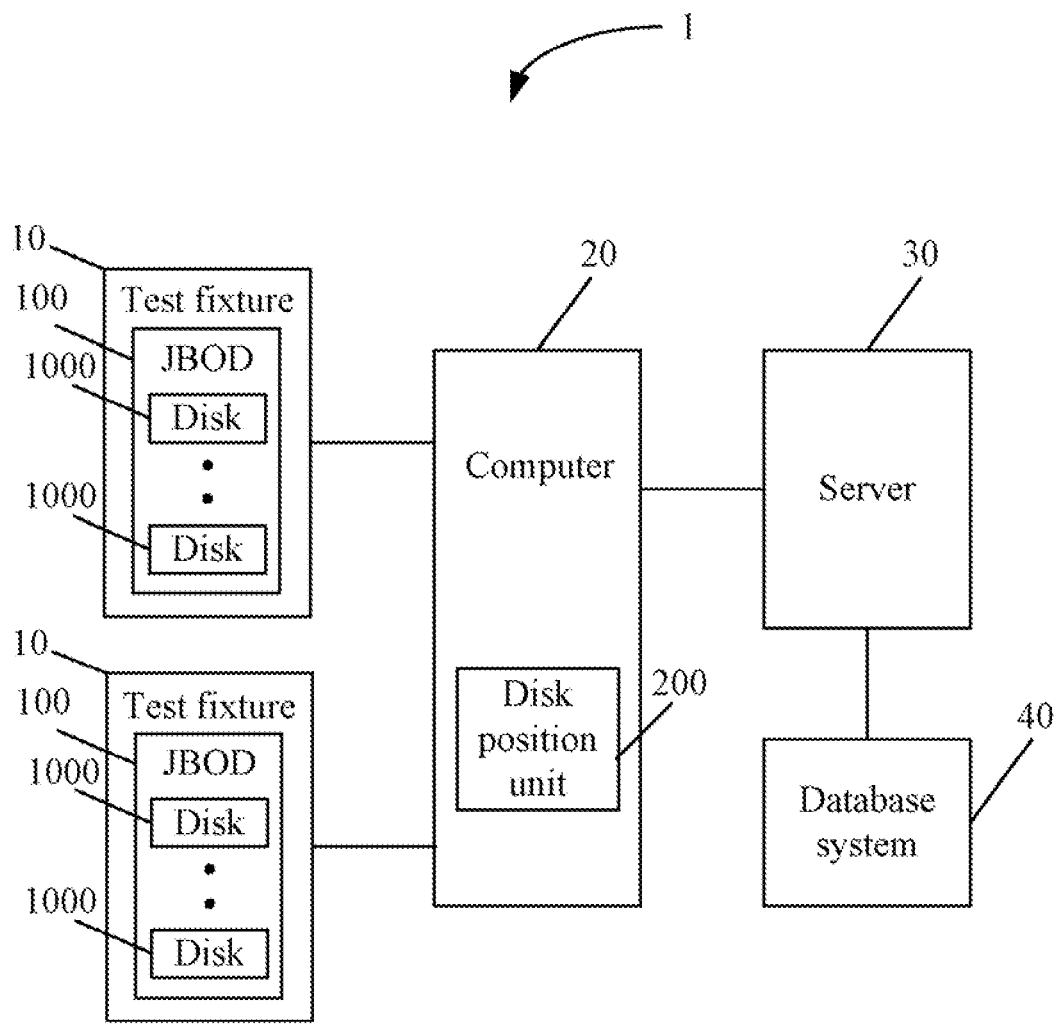
FIG. 1 is a system view of one embodiment of a disk position system.

FIG. 1 is a block diagram of one embodiment of a disk position system 1. In one embodiment, the disk position system 1 may comprise one or more test fixtures 10, a computing device 20, and a server 30. Each test fixture 10 includes just a bunch of disks (JBOD) 100. The disk position system 1 may be used to automatically determine a position of a disk 1000 in the JBOD 100 when the disk 1000 works abnormally. The computing device 20 is electronically connected to the one or more test fixtures 10 and the server 30. In one embodiment, the computing device 20 may be a personal computer (PC), a network server, or any other data-processing equipment. Further details of the computing device 20 will be described below.

In one embodiment, the test fixture 10 is connected to the JBOD 100 using a serial attached small computer system interface (SCSI). The test fixture 10 may be a device or apparatus to hold or support the JBOD 100 to test performance of the disks 1000. In one embodiment, the test fixture 10 may be, but is not limited to, a motherboard.

The server 30 is electronically connected to a database system 40 using open database connectivity (ODBC) or java database connectivity (JDBC), for example. In one embodiment, the server 30 may be a personal computer (PC), a network server, or any other data-processing equipment. Additionally, the computing device 20 provides an operation interface for controlling one or more operations of the server 30.

The database system 40 may store a JBOD table and one or more disk tables. Each JBOD 100 has an order number and a serial number. The order number and the serial number of each JBOD 100 are stored into the JBOD table. It is understood that the JBOD table is defined as a set of data values for storing positioning information of the JBOD 100. In one embodiment, the JBOD table is shown in the following example:

| Order number | Serial number |
| --- | --- |
| 1 | 123456789012 |
| 2 | 123546878545 |

The JBOD table above is organized using a model of vertical columns and horizontal rows. The JBOD table above includes two vertical columns, the first vertical column is named as the "order number", and the second vertical column is named as the "serial number." The JBOD table above includes two pieces of data and each piece of data includes data values. The first data value is the order number and the second data value is the serial number. The maximum order number in the JBOD table shows the quantity of the JBOD 100. For example, according to the JBOD table above, the maximum order number in the JBOD table is "2", it indicates that two JBOD 100 are connected to the computing device 20, the serial numbers of the two JBOD 100 are "123456789012" and "123546878545." Additionally, the order number in the JBOD table corresponds to a position of the JBOD 100. For example, the order number "1" corresponds to a position of "A," it is shown that the JBOD (serial number is "123456789012") is located at the position of "A." If the order number "2" corresponds to a position of "B," it is shown that the JBOD 100 (serial number is "123456789012") is located at the position of "B."

Each disk 1000 has the order number and the serial number. The order number and the serial number of each disk 1000 are stored into the disk table. It is understood that the disk table is defined as a set of data values for storing positioning information of the disks 1000 included in the JBOD 100. Each disk table corresponds to a JBOD 100. Furthermore, the order number in the JBOD table corresponds to a name of the disk table. For example, if the order number in the JBOD table is "1," the name of the disk table corresponding to the JBOD that the serial number is "123456789012" is "jbod_1." If the order number of the JBOD table is "2," the name of the disk table corresponding to the JBOD that the serial number is "123546878545" is "jbod_2." In one embodiment, the disk table is shown in the following example:

| Order number | Serial number |
| --- | --- |
| 01 | 998877665543 |
| 02 | 998877265525 |
| 03 | 991277265415 |
| 04 | 998377665543 |
| 05 | 998874265525 |
| 06 | 998877255415 |
| 07 | 998866665543 |
| 08 | 998877115525 |
| 09 | 992277265415 |
| 10 | 993377665543 |
| 11 | 994477265525 |
| 12 | 995577265415 |

The disk table above includes two vertical columns, the first vertical column is named the as "order number," and the second vertical column is named the as "serial number." The disk table above includes two pieces of data and each piece of data includes data values. The first data value is the order number and the second data value is the serial number. The maximum order number in the disk table shows the quantity of the disks 1000 in the JBOD 100. For example, according to the disk table above, the maximum order number in the disk table is "12," it indicates that twelve disks 1000 are included in the JBOD 100. Each disk 1000 included in the JBOD 100 has the order number and the serial number. Additionally, the order number in the disk table corresponds to a position of the disk 1000. For example, the order number "01" corresponds to a position of "a," it is shown that the disk (serial number is "998877665543") is located at the position of "a." If the order number "02" corresponds to a position of "b," it is shown that the disk 1000 (serial number is "998877265525") is located at the position of "b."

Figure 2:
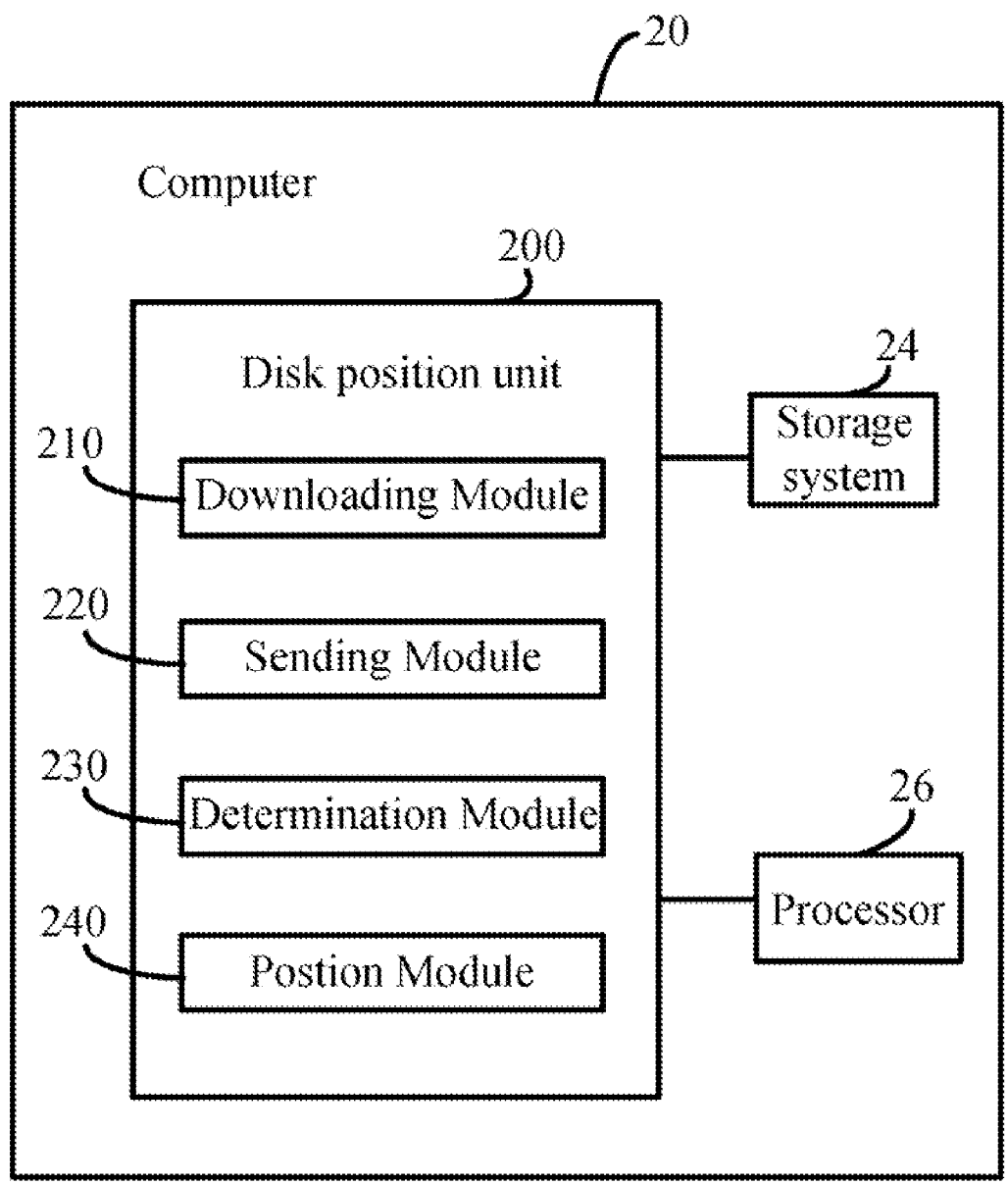
FIG. 2 is a block diagram of one embodiment of a computer included in FIG. 1.

FIG. 2 is a block diagram of one embodiment of the computing device 20. The computing device 20 includes a disk position unit 200. The disk position unit 200 may be used to automatically determine the position of the disk 1000 when the disk 1000 works abnormally. In one embodiment, the disk position unit 200 includes a downloading module 210, a sending module 220, a determination module 230, and a position module 240. The modules 210-240 may include computerized code in the form of one or more programs that are stored in a storage system 24. The computerized code includes instructions that are executed by the at least one processor 26 to provide functions of the modules 210-240. The storage system 24 may be a cache or a memory, such as an EPROM, HDD, or flash memory.

The downloading module 210 downloads the JBOD table from the server 30.

The sending module 220 sends a command to each test fixture 10 to obtain the serial number of the JBOD 100 in each test fixture 10 and obtain the order number of the JBOD 100 according to the JBOD table. In one embodiment, the command may be, but is not limited to, a SCSI command. If the obtained serial number of the JBOD 10 is "123456789012", the order number of the JBOD 10 is "1."

The downloading module 210 downloads the disk table according to the order number of the JBOD 10. In one embodiment, if the order number of the JBOD 10 is "1", the downloading module 230 downloads the disk table "jbod_1". If the order number of the JBOD 10 is "2", the downloading module 230 downloads the disk table "jbod_2."

The determination module 230 searches out problem disks 1000 by determining if each disk 1000 included in the JBOD 10 works normally. In one embodiment, each disk 1000 has a corresponding device node in an operating system (e.g., Linux operating system). The determination module 230 searches out each disk 1000 by the corresponding device node, and determines if the disk 1000 works normally. In one embodiment, the determination module 230 writes data into the disk 1000 and reads the written data from the disk 1000, and determines if the written data is the same as the read data. For example, the determination module 230 writes a string (e.g., hello!) into the disk 1000, and reads the string from the disk 1000, if the read string is also "hello!", the disk 1000 works normally. Otherwise, if the read string is not "hello!", the disk 1000 works abnormally and the disk 1000 is the problem disk 1000.

The determination module 230 determines if the computing device 20 can obtain the serial number of each problem disk 1000. In one embodiment, the computing device 20 sends the SCSI command to read the serial number of the disk 1000.

The position module 240 notifies a user of the order number of the problem disk 1000 and the order number of the JBOD 100, in response to a determination that the computing device 20 can obtain the serial number of the problem disk 1000. The position module 240 obtains the order number of the problem disk 1000 according to the disk table. For example, if the serial number of the problem disk 1000 is "998877665543", the order number of the problem disk 1000 is "01". In one embodiment, the position module 240 sends the order number of the problem disk 1000 and the order number of the JBOD 100 to the user, so that the user may be aware of the position of the problem disk 1000 quickly and easily. For example, if the order number of the problem disk 1000 is "01", and the order number of the JBOD 100 is "1", the user can determine that the position of the JBOD 100 is "A", and the position of the problem disk 1000 in the JBOD 100 is "a."

The position module 240 further obtains the order number of the problem disk 1000 by deleting the data of the disk 1000 that works normally from the disk table, and notifies the user of the order number of the disk 1000 and the order number of the JBOD 100, in response to a determination that the computing device 20 fails to obtain serial number of the problem disk 1000. For example, assuming that the disk 1000 (serial number is "998877665543") is the problem disk 1000, and the serial number of the problem disk 1000 fails to be obtained, then the position module 240 obtains the serial number of the other eleven disks 1000 that works normally and deletes the data of the eleven disks 1000 from the disk table. After deleting the data of the eleven disks 1000, the disk table is left the data of the problem disk 1000. The position module 240 can obtain the order number of the problem disk 1000 from the disk table.

Figure 3:
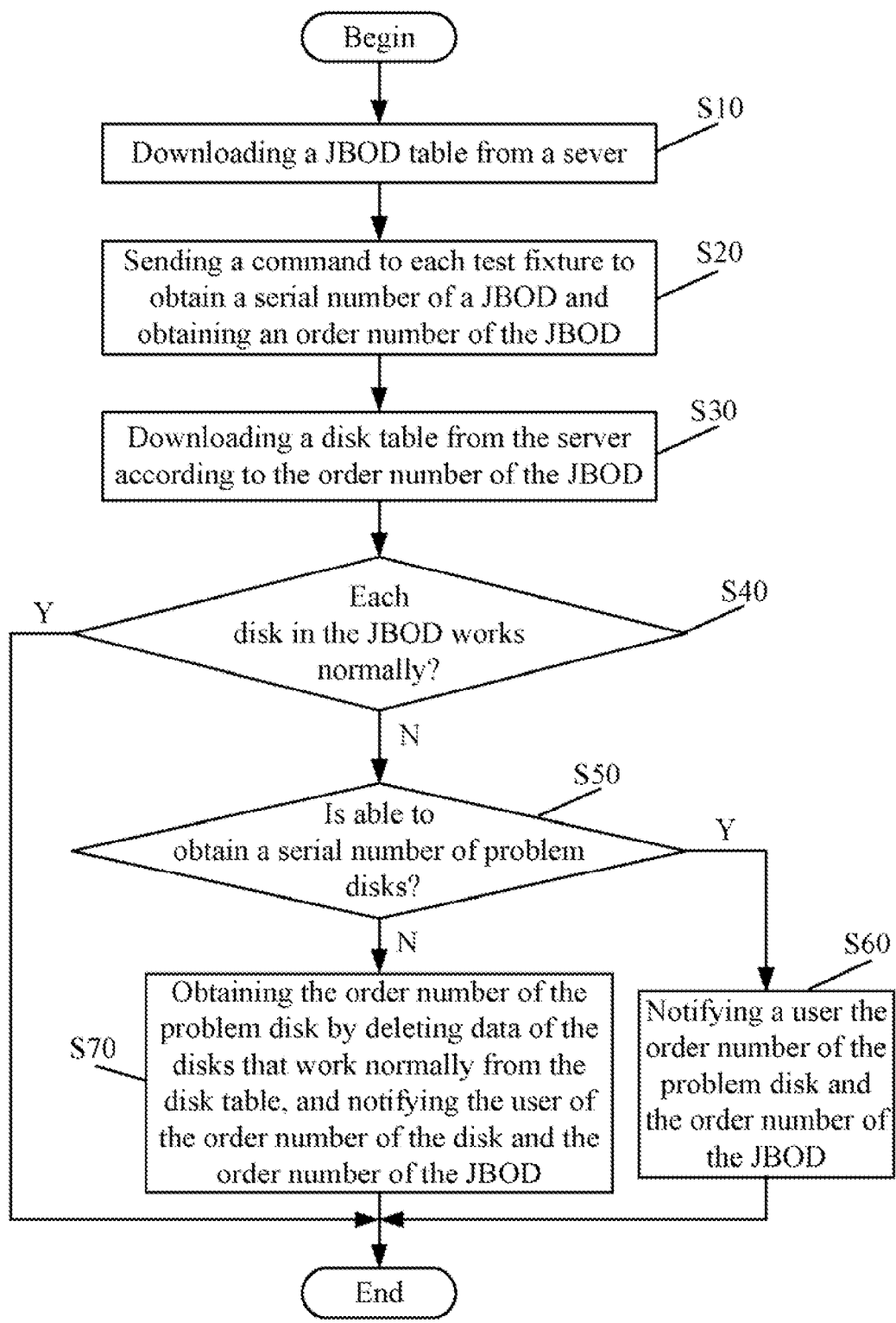
FIG. 3 is a flowchart of one embodiment of a disk position method.

FIG. 3 is a flowchart of one embodiment of a disk position method. Depending on the embodiment, additional blocks may be added, others deleted, and the ordering of the blocks may be changed.

In block S10, the downloading module 210 downloads the JBOD table from the server 30.

In block S20, the sending module 220 sends a command to each test fixture 10 to obtain the serial number of the JBOD 100 in each test fixture 10 and obtain the order number of the JBOD 100 according to the JBOD table. For example, if the obtained serial number of the JBOD 10 is "123456789012", the order number of the JBOD 10 is "1."

In block S30, the downloading module 210 downloads the disk table according to the order number of the JBOD 10. As mentioned above, if the order number of the JBOD 10 is "1", the downloading module 230 downloads the disk table "jbod_1". If the order number of the JBOD 10 is "2", the downloading module 230 downloads the disk table "jbod_2."

In block S40, the determination module 230 searches out problem disks 1000 by determining if each disk 1000 included in the JBOD 10 works normally. As mentioned above, the determination module 230 searches out each disk 1000 by the corresponding device node and determines if the disk 1000 works normally. In one embodiment, the determination module 230 writes data into the disk 1000 and reads the written data from the disk 1000, and determines if the written data is the same as the read data. For example, the determination module 230 writes a string (e.g., hello!) into the disk 1000, and reads the string from the disk 1000, if the read string is also "hello!," the disk 1000 works normally. If each disk 1000 works normally, the procedure goes to end. Otherwise, if the read string is not "hello!," the disk 1000 works abnormally and the disk 1000 is the problem disk 1000, the procedure goes to the block S50.

In block S50, the determination module 230 determines if the computing device 20 can obtain serial number of each problem disk 1000. In one embodiment, the computing device 20 sends the SCSI command to read the serial number of the disk 1000. If the computing device 20 fails to read the serial number of the disk 1000, the computing device 20 fails to obtain the serial number of the disk 1000, the procedure goes to the block S70.

In block S60, the position module 240 notifies the user of the order number of the disk 1000 and the order number of the JBOD 100, in response to a determination that the computing device 20 can obtain serial number of the problem disk 1000.

In block S70, the position module 240 further obtains the order number of the problem disk 1000 by deleting the data of the disk 1000 that works normally from the disk table, and notifies to a user of the order number of the disk 1000 and the order number of the JBOD 100, in response to a determination that the computing device 20 fails to obtain the serial number of the problem disk 1000. For example, assuming that the disk 1000 (serial number is "998877665543") is the problem disk 1000, and the serial number of the problem disk 1000 fails to be obtained, then the position module 240 obtains the serial number of the other eleven disks 1000 that works normally and deletes the data of the eleven disks 1000 from the disk table. After deleting the data of the eleven disks 1000, the disk table is left the data of the problem disk 1000. The position module 240 can obtain the order number of the problem disk 1000 from the disk table.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, the computing device in electronic communication with one or more test fixtures that comprise one or more just a bundle of disks (JBOD), comprising:
    a storage system;
    at least one processor; and
    one or more programs stored in the storage system and being executable by the at least one processor, the one or more programs comprising:
        a downloading module operable to download a JBOD table from a server in electronic communication with the computing device, wherein the JBOD table comprises a order number of each of the JBOD and a serial number of each of the JBOD, wherein each of the JBOD comprise one or more disks;
        a sending module operable to send a command to each of the one or more test fixtures to obtain the serial number of each of the JBOD from each of the one or more test fixtures and obtain the order number of each of the JBOD according to the JBOD table, wherein the order number of each of the JBOD corresponds to a disk table;
        a downloading module operable to download the disk table according to the order number of each of the JBOD, wherein the disk table comprises an order number of each of the one or more disks and a serial number of the one or more disks;
        the determination module further operable to search out problem disks from each of the JBOD by determining if each of the one or more disks in the JBOD works normally, and determine if the serial number of each of the problem disks is obtained;
        a position module operable to notify a user of an order number of each of the problem disks and the order number of each of the JBOD, in response to a determination that a serial number of each of the problem disks is obtained; and
        a position module further operable to obtain the order number of each of the problem disks by deleting data of the one or more disks that work normally from the disk table, and notify the user of the order number of the one or more disks and the order number of each of the JBOD, in response to a determination that the serial number of each of the problem disks is not obtained.

2. The computing device of claim 1, wherein the order number of each of the JBOD corresponds to a position of each of the JBOD.

3. The computing device of claim 1, wherein the order number of each of the one or more disks corresponds to a position of each of the one or more disks in the JBOD.

4. The computing device of claim 1, wherein the order number of each of the JBOD corresponds to a name of the disk table.

5. A disk position method implemented by a processor of a computing device, the computing device in electronic communication with one or more test fixtures which comprise one or more just a bundle of disks (JBOD), the method comprising:
    downloading a just a JBOD table from a server in electronic communication with the computing device, wherein the JBOD table comprises a order number of each of the JBOD and a serial number of each of the JBOD, wherein each of the JBOD comprise one or more disks;
    sending a command to each of the one or more test fixtures to obtain the serial number of each of the JBOD from each of the one or more test fixtures and obtain the order number of each of the JBOD according to the JBOD table, wherein the order number of each of the JBOD corresponds to a disk table;
    downloading the disk table according to the order number of each of the JBOD, wherein the disk table comprises an order number of each of the one or more disks and a serial number of each of the one or more disks;
    searching out problem disks by determining if each of the one or more disks in the JBOD works normally, and determining if a serial number of each of the problem disks is obtained;
    notifying a user of an order number of each of the problem disks and the order number of each of the JBOD, in response to a determination that a serial number of each of the problem disks is obtained; and obtaining the order number of each of the problem disks by deleting data of the one or more disks that work normally from the disk table, and notifying the user of the order number of each of the one or more disks and the order number of each of the JBOD, in response to a determination that the serial number of each of the problem disks is not obtained.

6. The method of claim 5, wherein the order number of each of the JBOD corresponds to a position of each of the JBOD.

7. The method of claim 5, wherein the order number of each of the one or more disks corresponds to a position of the one or more disks in the JBOD.

8. The method of claim 5, wherein the order number of each of the JBOD corresponds to a name of the disk table.

9. A non-transitory computer-readable medium having stored thereon instructions that, when executed by a computing device, the computing device in electronic communication with one or more test fixtures which comprise one or more just a bundle of disks (JBOD), causing the computing device to perform a disk position method, the method comprising:

downloading a just a JBOD table from a server in electronic communication with the computing device, wherein the JBOD table comprises a order number of each of the JBOD and a serial number of each of the JBOD, wherein each of the JBOD comprise one or more disks;

sending a command to each of the one or more test fixtures to obtain the serial number of each of the JBOD from each of the one or more test fixtures and obtain the order number of each of the JBOD according to the JBOD table, wherein the order number of each of the JBOD corresponds to a disk table;

downloading the disk table according to the order number of each of the JBOD, wherein the disk table comprises an order number of each of the one or more disks and a serial number of each of the one or more disks;

searching out problem disks by determining if each of the one or more disks in the JBOD works normally, and determining if a serial number of each of the problem disks is obtained;

notifying a user of an order number of each of the problem disks and the order number of each of the JBOD, in response to a determination that a serial number of each of the problem disks is obtained; and obtaining the order number of each of the problem disks by deleting data of the one or more disks that work normally from the disk table, and notifying the user of the order number of each of the one or more disks and the order number of each of the JBOD, in response to a determination that the serial number of each of the problem disks is not obtained.

10. The medium of claim 9, wherein the order number of each of the JBOD corresponds to a position of each of the JBOD.

11. The medium of claim 9, wherein the order number of each of the one or more disks corresponds to a position of each of the one or more disks in the JBOD.

12. The medium of claim 9, wherein the order number of each of the JBOD corresponds to a name of the disk table.

* * * * *

UNITED STATES PATENT AND TRADEMARK OFFICE
CERTIFICATE OF CORRECTION

PATENT NO. : 8,300,507 B2  Page 1 of 1
APPLICATION NO. : 13/221850
DATED : October 30, 2012
INVENTOR(S) : Jun-Jia Lin It is certified that error appears in the above-identified patent and that said Letters Patent is hereby corrected as shown below:

Please replace Item (30) regarding "Foreign Application Priority Data" on the title page of the Patent with the following:

(30) Foreign Application Priority Data

Nov. 4 2010 (CN) .........................2010 1 0531860

Signed and Sealed this
Twenty-fourth Day of December, 2013

Margaret A. Focarino
*Commissioner for Patents of the United States Patent and Trademark Office*